United States Patent [19]

Karplus et al.

[11] 4,413,531
[45] Nov. 8, 1983

[54] DOPPLER FLOWMETER

[75] Inventors: Henry H. B. Karplus, Hinsdale; Apostolos C. Raptis, Downers Grove, both of Ill.

[73] Assignee: The United States of America as represented by the U.S. Department of Energy, Washington, D.C.

[21] Appl. No.: 321,345

[22] Filed: Nov. 13, 1981

[51] Int. Cl.$^3$ .............................................. G01F 1/66
[52] U.S. Cl. ................................. 73/861.25; 73/861.04
[58] Field of Search ........................ 73/861.25, 861.04; 367/90, 100; 324/77 D

[56] References Cited

U.S. PATENT DOCUMENTS 3,940,731 2/1976 Cooper et al. ................... 73/861.25
4,095,597 6/1978 Hassler ............................... 128/663
4,255,977 3/1981 Newhouse et al. ............. 73/861.25

OTHER PUBLICATIONS

"Flow Measurement of Dense Slurries Using the Sonic Doppler Principle", H. B. Karplus and A. C. Raptis, Conference, Cherry Hill, N.J., (25-27 Sep. 1978), IEEE, pp. 291-295.

Primary Examiner—Herbert Goldstein
Assistant Examiner—Brian Tumm
Attorney, Agent, or Firm—Charles F. Lind; Bruce R. Mansfield; Richard G. Besha

[57] ABSTRACT

A Doppler flowmeter impulses an ultrasonic fixed-frequency signal obliquely into a slurry flowing in a pipe and a reflected signal is detected after having been scattered off of the slurry particles, whereby the shift in frequencies between the signals is proportional to the slurry velocity and hence slurry flow rate. This flowmeter filters the Doppler frequency-shift signal, compares the filtered and unfiltered shift signals in a divider to obtain a ratio, and then further compares this ratio against a preset fractional ratio. The flowmeter utilizes a voltage-to-frequency convertor to generate a pulsed signal having a determinable rate of repetition precisely proportional to the divergence of the ratios. The pulsed signal serves as the input control for a frequency-controlled low-pass filter, which provides thereby that the cutoff frequency of the filtered signal is known. The flowmeter provides a feedback control by minimizing the divergence. With the cutoff frequency and preset fractional ratio known, the slurry velocity and hence flow will also be determinable.

8 Claims, 6 Drawing Figures

DOPPLER FLOWMETER

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

Many industrial applications, such as coal conversion plants, paper mills, cement manufacturing plants, and sewage treatment plants have difficulty in reliably measuring the flow of a liquid type slurry through a pipe. Part of the problem is that the slurry temperature and/or pressure can be quite high, the slurry can be corrosive or abrasive, or the slurry can be of high viscosity. Conventional flowmeters requiring structure located inside of the pipe or having takeoff ports in the pipe walls generally prove inappropriate as such flowmeters tend to foul up in a very short time. Flowmeters that use structure located only outside of the pipe, including the electromagnetic flowmeter, the thermal flowmeter, and the sonic flowmeter, are available and have various degrees of appeal. The electromagnetic flowmeter however, requires that the liquid conveyed be electrically conductive in order to detect flow movement. In the thermal flowmeter, heat is applied to the moving slurry between a pair of axially spaced sensors, and the temperature differential is sensed. This flowmeter proves inappropriate where the liquid temperature itself is extremely high or where the heat loss from the pipe is high. The sonic flowmeter utilizes the possible shift in the time or location of a sonic signal through the slurry as a function of the slurry velocity, and the one type includes the Doppler flowmeter.

An ultrasonic flowmeter of the Doppler type would have two transducer units bonded or mechanically held tightly against the outside walls of the pipe. A constant frequency ultrasonic signal (500,000 Hz, for example) from the one transducer unit is transmitted through the pipe wall obliquely into the flow stream and is scattered off the particles moving therein, and the scattered signal is detected by the other transducer unit. In theory, the detected signal will have a shift in frequency to higher or lower than that of the original signal, depending on whether the signal is sent out against or in the same direction respectively, as the direction of the slurry flow. The Doppler frequency shift is proportional to the operating frequency and to the ratio of the vector components of the slurry velocity in the direction of the wave propagation at a velocity. Thus $$F_d = 2F_o(V/C) \cos \theta$$

where
$F_d$ = Doppler frequency shift
$F_o$ = Sending transducer frequency
$V$ = Velocity of slurry
$C$ = Velocity of wave
$\theta$ = Angle of wave propagation relative to the axial flow.

The use of ultrasonic waves is attractive because of the relatively low propagation velocity and the ability to penetrate solid pipes and opaque slurries. However, as there are many particles moving with the slurry, the detected frequency shift signal therefore is received off of many particles and is in the form of a broadband of many frequencies. Correlating the frequency shift signal to the velocity flow thus becomes very difficult. Moreover, inasmuch as the Doppler frequency shift is a function of the velocity of the slurry flow compared to the velocity of the ultrasonic signal in the slurry, the frequency shift is quite small, of the order of 0.01–1.0% of the original ultrasonic signal.

SUMMARY OF THE INVENTION

This invention teaches an improved Doppler flowmeter having a transmitter that emits a fixed frequency ultrasonic signal into a slurry flowing in a pipe, this signal being scattered off particles in the slurry, and the scattered signal being detected then by a receiver; and the Doppler shift signal representing the difference between these signals is determined and used to give the velocity of the slurry.

The Doppler shift signal comprises a continuous broadband of different frequencies. For laminar flow, the frequency distribution is uniform ideally to correspond to the uniform distribution of slurry particles travelling in the pipe at the various incrementally different speeds from near zero up to the maximum. For turbulent flow, the frequency distribution is weighted more toward the maximum to correspond to the more uniform near maximum velocity of slurry over the central region of the pipe. The flowmeter determines the area under the power spectrum of the Doppler shift signal, which thereby corresponds to and gives slurry velocity and slurry flow.

The flowmeter utilizes frequency controlled means to obtain a cutoff signal that is a fractional ratio of the bandwidth of the Doppler shift signal, further utilizes means to compare the cutoff and Doppler shift signals to generate a fractional ratio and an error function signal that is proportional to the departure of this fractional ratio from a preset fixed fractional ratio, further utilizes a precise voltage-to-frequency converter to produce a pulsed signal that is at an adjusted repetition rate proportional to the error function signal and to introduce this pulsed signal as a control input to the frequency controlled means, and further utilizes feedback loop means tending to minimize the error function, whereby the pulse rate and hence cutoff signal and hence the Doppler shift signal can each be determined and obtain thereby the slurry flow.

DETAILED DESCRIPTION OF THE PREFERRED EMBODIMENT

Figure 1:
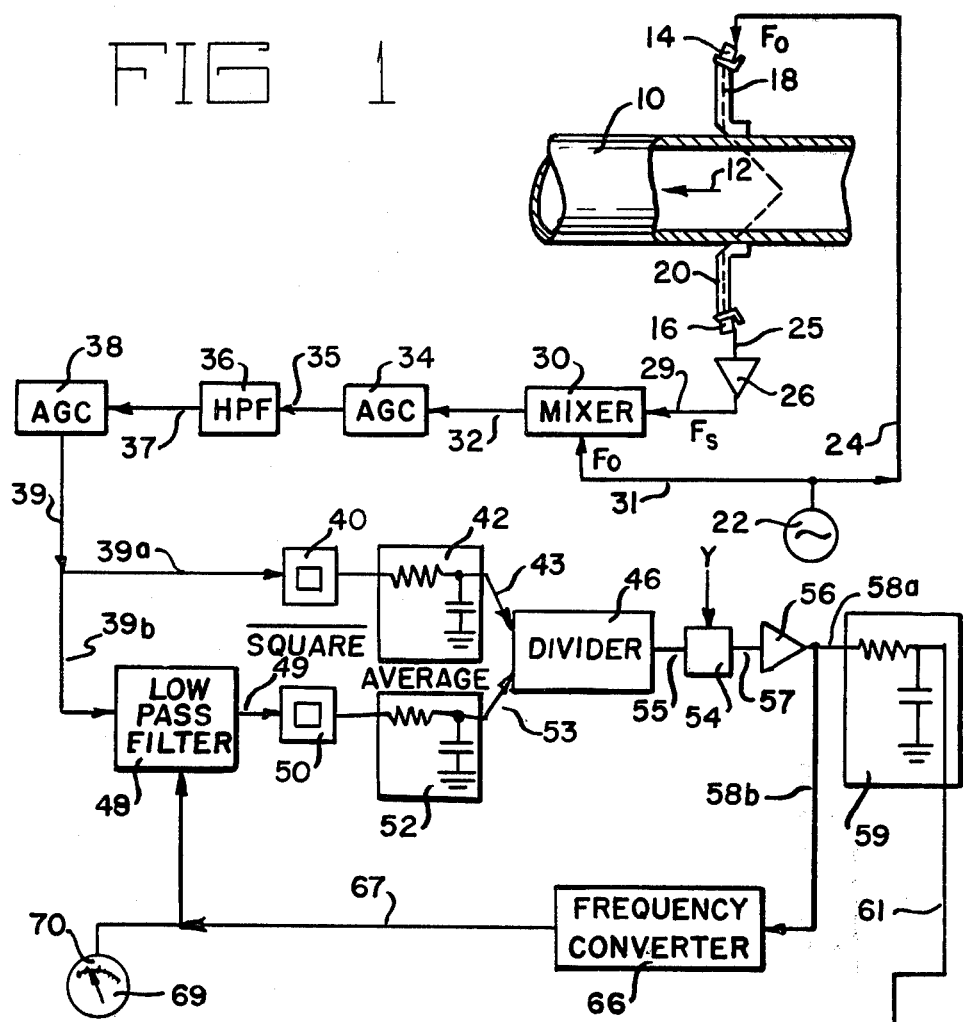
FIG. 1 is a schematic illustration of the improved flowmeter and its operating control.

FIG. 1 illustrates in schematic form a preferred embodiment of the subject invention. The figure shows a pipe 10 through which a liquid slurry would flow in the direction indicated by the arrow 12. The flowmeter would comprise a pair of transducer units 14 and 16 that are mounted in sound transmitting relationship relative to the exterior wall of the pipe. In order to provide isolation from the temperature of the pipe, waveguides 18 and 20 are actually positioned between the pipe surface and the surface of the transducer, the waveguides being of a sound transmitting material but yet have sufficient thermal insulating capacity to keep the temperature of the transducer low as compared to that of the pipe surface. Although the transducers 14 and 16 are shown on opposite sides of the pipe at similar axial locations relative to the pipe, the actual positions of the transducers can be varied both angularly and axially.

As illustrated, transducer 14 is the signal sending unit and transducer 16 is the signal receiving unit. The transducer 14 is activated by an electric generator 22 via conductor 24, and the activated transducer 14 in turn emits a fixed frequency tone or signal that is transmitted through the waveguide and pipe wall obliquely into the slurry toward the pipe center in the direction against the slurry flow. This signal is scattered off many particles in the slurry, and the scattered signal is picked up by the receiving transducer 16. This scattered signal via conductor 25 is directed to amplifier 26 and the amplified signal is carried via conductor 29 to a mixer 30. The mixer 30 in effect combines the fixed input signal received at conductor 31 and the scattered signal received at conductor 29 to isolate a Doppler shift signal at conductor 32.

The Doppler frequency shift signal, as thus isolated by mixer 30, is treated by the following components in order to allow for standardized signal analysis. As illustrated in FIG. 1, the signal at conductor 32 is first passed through an automatic gain control 34, to make all signals of approximately equal amplitude. The signal at conductor 35 is then passed through a high pass filter 36 which effectively stops the very low frequency part of the signal. Background noise, such as caused by bubbles, tends to clutter the low frequency range a disproportionate amount. Based on the severity of this noise condition compared to the total signal and the need for flowmeter accuracy at extremely low flow rates, the amount filtered out represents a compromise of sort but generally is in the 5–10% range of the maximum. The resultant signal at conductor 37 is then passed through automatic gain control 38, again to make the strength of all compared signals at conductor 39 of uniform amplitude. Thus, only the shape of the Doppler shift spectrum is of concern.

In the circuit illustrated in FIG. 1, the alternating current Doppler shift signal $V_d$ on the one hand is passed by conductor 39a through a squaring unit 40 and an averaging unit 42 and the resultant squared, averaged and rectified DC signal $\overline{V_d^2}$ at line 43 is admitted as one input to analog divider 46. This squared and average voltage signal is proportional then to the power of the signal. On the other hand, the Doppler shift signal $V_d$ is also transmitted via conductor 39b through an adjustable low pass filter unit 48 to exit at conductor 49 as signal $V_c$, and this is passed through a squaring unit 50 and an averaging unit 52, and the resultant rectified DC signal $\overline{V_c^2}$ at conductor 53 is admitted as a counterpart input to the analog divider 46. This squared and averaged DC signal $\overline{V_c^2}$ also is proportional then to the power of the signal.

The analog divider 46 in effect compares the signals at conductors 53 and 43 to obtain a fixed quotient or fractional ratio $(\overline{V_c^2})/(\overline{V_d^2})$ at conductor 55. The fractional ratio from the divider 46 is then additively compared with a constant value "Y" in a summation unit 54. The output signal "Y $-(\overline{V_c^2})/(\overline{V_d^2})$" is passed via conductor 57 through an amplifier 56 which amplifies the signal by a large constant "C", such as on the order of 100. This magnified signal $V_o$ at conductor 58a then passes through an averaging unit 59, conductor 61 and amplifier 60 to produce at conductor 62 a DC output voltage $\overline{V_o}$. The voltage of course can be measured with a potentiometer 64 calibrated with a scale 65 to indicate the velocity and/or flow directly.

The magnified signal $V_o$ further passes via conductor 58b to a precise voltage-to-frequency convertor 66. The convertor 66 has the characteristics of producing at conductor 67 a pulsed signal $F_p$ at a repetition rate that is proportional to the input voltage signal at conductor 58b. This pulsed signal $F_p$ at the line 67 is used to control the low pass filter 48. The low pass filter 48 is frequency responsive and has the characteristic to pass to conductor 49 only the lower frequency bandwidth of the input signal at line 39b and variably and adjustably cuts off the higher frequency bandwidth from the signal, depending on the rate of repetition of the pulsed control signal at conductor 67. The filter 48 further has the characteristic to maintain the frequency of the cut off signal at conductor 49 a fixed ratio of the pulsed input rate of repetition at conductor 67, or as selected herein, at one-one hundredth (1/100) of the pulsed rate.

In effect, the loop circuit illustrated is an automatic servo or feedback control that continuingly compares the squared and averaged filtered and nonfiltered Doppler shift signals or voltages $\overline{V_c^2}$ and $\overline{V_d^2}$ against each other and the fractional ratio constant Y. By making the amplification constant C at amplifier 56 quite large, the ratio $\overline{V_c^2}/\overline{V_d^2}$ will approach the preset fractional ratio constant Y and the error function $Y-\overline{V_c^2}/\overline{V_d^2}$ will become quite small. Further the feedback loop seeks out stabilized readings for flow, so that if the error function were instantaneously too large, the voltage $V_o$ at the conductor 58b to the voltage-to-frequency convertor 66 would likewise be too high to provide a higher rate of repetition of the pulsed signal $F_p$ at line 67 than needed, which then would cause the controlled filter 48 to increase the cutoff frequency $F_c$ so that $\overline{V_c^2}$ also would be increased, so that the larger $\overline{V_c^2}$ when compared with the Doppler shift signal $\overline{V_d^2}$ at input line 43 would automatically produce a smaller error function signal.

The frequency-controlled low pass filter 48 is selected to provide that the output cutoff frequency $F_c$ is precisely related the pulsed control frequency $F_p$, for example in the R5609, $F_c$ is 0.01 times $F_p$. Thus, if pulsed frequency $F_p$ is at 35,000 Hz, the adjusted filtered output cutoff $F_c$ will be equal to 350 Hz.

Knowing the cutoff frequency $F_c$ and the preset cutoff fractional ratio Y, the bandwidth or corner-frequency $F_d$ of the original signal can be inferred. The feedback circuit makes sure that $F_c/F_d = \overline{V_c^2}/\overline{V_d^2} \cong Y$. This further corresponds to the power level of the voltage squared signal. The departure or error function signal $Y = \overline{V_c^2}/\overline{V_d^2}$ can be made small by making the feedback gain C large.

As an interpretation of the fixed and scattered signals, the sending transducer 14 has a fixed tone at frequency $F_o$, for example at 500,000 Hz, and this fixed signal is scattered by the pipe wall in homogeneities and by the many particles in the slurry and is received as signal $F_s$ at the transducer receiver 16. The signal scattered off the pipe wall in homogeneities will be "background" and will be the same as the transmitted signal frequency $F_o$. The signal scattered off the many slurry particles moving toward the source of the signal will be shifted to a slightly higher frequency than the fixed tone. Inasmuch as flow velocities will be very low when compared to the speed of the signal through the slurry, the maximum shift in frequency is very small compared to the fixed tone frequency, such as of the order of magnitude of 20–2000 Hz versus 500,000 Hz. The receiving transducer 16 in turn converts the many frequency scattered signals into a single AC voltage, which includes both the background and particle scattered frequencies.

The resulting Doppler shift signal is comprised of many separate alternating current impulses each at a specific frequency, being representative of a particle in the flow stream moving at a specific speed. In this regard, it is well known that under laminar flow conditions, the flow in a pipe is at maximum velocity at or near the pipe center, is at substantially zero velocity at the molecular layer on the pipe walls, and varies in velocity along a parabolic three dimensional cone from the maximum to the wall layer zero velocity. The number of particles flowing at each incrementally different velocity between the zero and maximum velocities is substantially equal. Conversely, turbulent flow has maximum velocity at or near the center of the pipe, little drop-off from this maximum velocity for most of the remaining cross section of the pipe moving toward the pipe walls, and a rapid dropoff in particle velocities across a narrow transition zone from the near maximum to zero velocity at the wall layer. Thus, most of the particles in turbulent flow are flowing at near maximum velocity.

Figure 2:
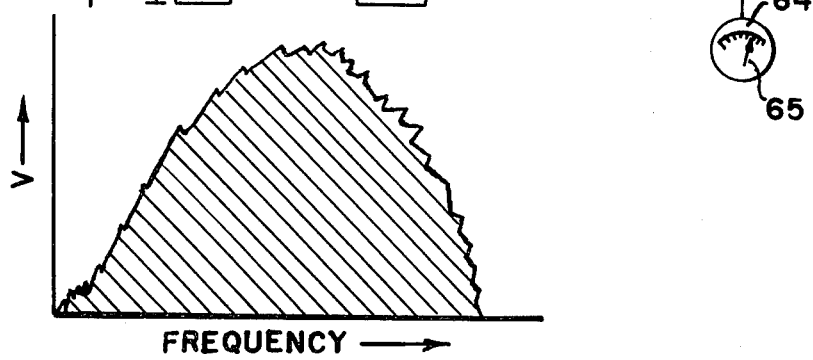
FIG. 2 is a Fourier spectrum illustrating the distribution of particles moving at the varying velocities, indicated in terms of a Doppler shift in frequency; for turbulent flow in a pipe.
Figure 3:
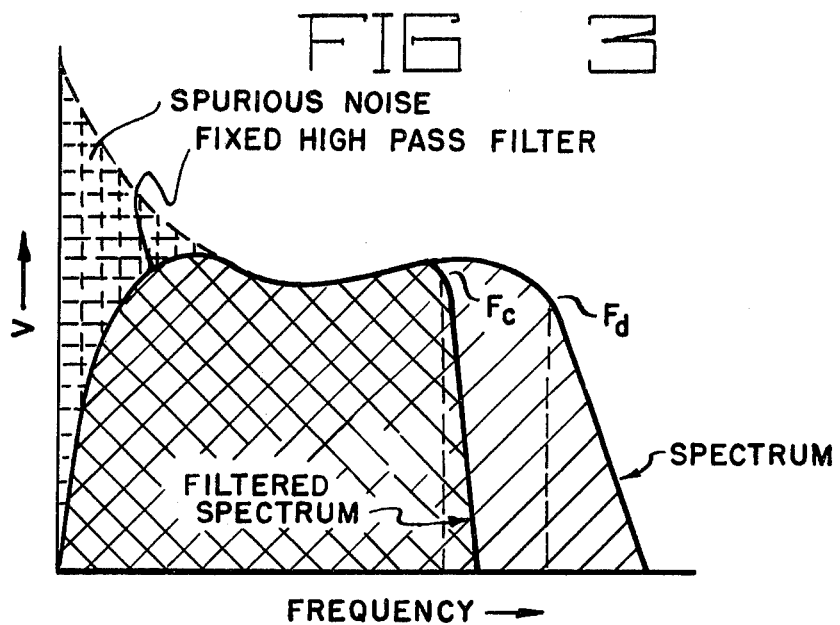
FIG. 3 is an idealized Fourier spectrum similar to that of FIG. 2, except for laminar flow, and indicating also symbolically the operational manipulations of the control used in the disclosed flowmeter.

As a further point of interpretation, the Doppler shift signal can be analyzed by a Fourier analyzer, where the spectrum indicates the frequency distribution corresponding to the velocity distribution of the particles in the flow. The idealized spectra for signals obtained under turbulent flow and laminar flow conditions are illustrated separately in FIGS. 2 and 3, respectively and together in FIG. 6.

Figure 5:
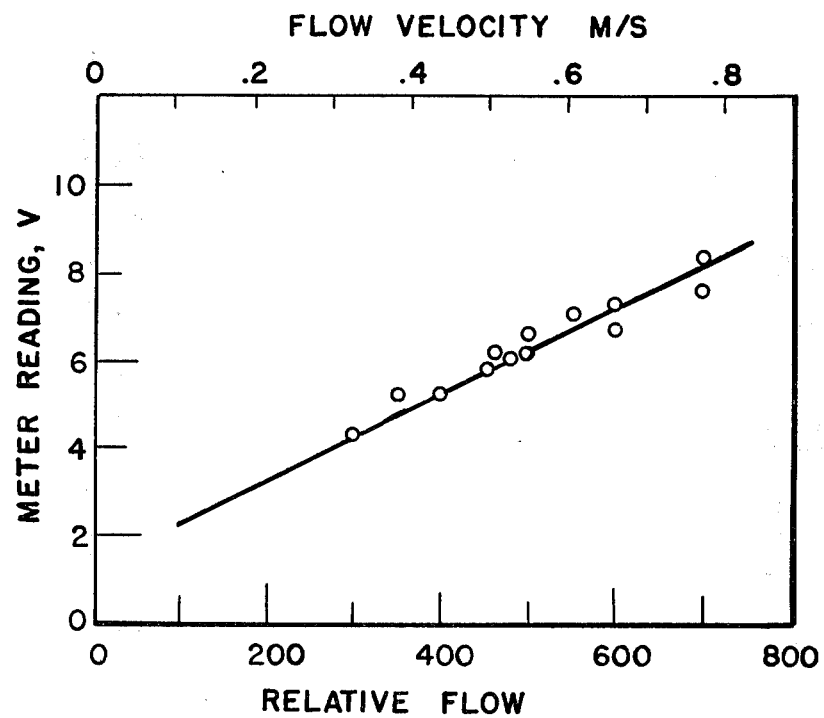
FIG. 5 is a calibration curve of the flowmeter as applied to the laminar flow spectrum curves of FIG. 4.
Figure 4:
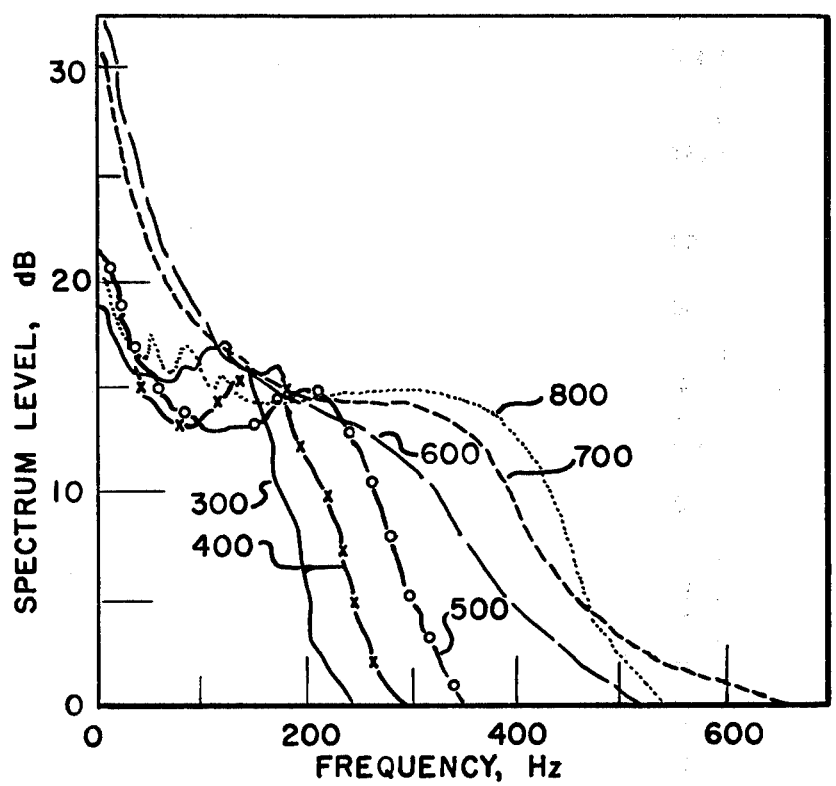
FIG. 4 is a family of laminar flow spectrum curves, similar to that illustrated in FIG. 3, actually measured for different flow rates in a two inch pipe.

FIG. 4 illustrates representative spectra obtained at different laminar flows, where the Doppler shift signals were analyzed with a Fourier analyzer (not shown). The characteristic continuous power spectrum generated can be noted for each flow rate, as well as the characteristic corner frequency of the spectrum. FIG. 5 illustrates the calibrated flowmeter outputs for the actual flow of slurry in the pipe according to that covered in FIG. 4.

Figure 6:
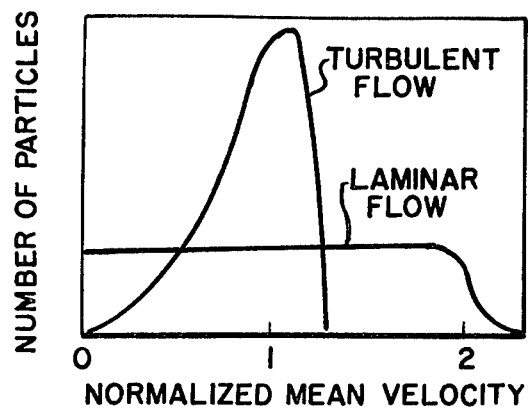
FIG. 6 shows two comparative curves for the particle distribution for turbulent and laminar flow conditions, as normalized against the average or mean velocity of the flow in a pipe system.

FIG. 6 illustrates the idealized relative distribution of the particles in turbulent flow and in laminar flow, as compared to the mean or average velocity of the flow. The average velocity of the flow in either case is indicated at the frequency corresponding to approximately the half way frequency splitting the power spectrum in half.

The corner frequency of the laminar flow spectrum is theoretically twice the Doppler frequency produced by the average velocity. The feedback circuit can measure this corner frequency. The power (or voltage squared) content of a broad-band spectrum signal is proportional to its bandwidth. The Doppler spectrum is compared to the filtered portion of it, and the controlled filter 48 is adjusted automatically to keep the ratio $F_c/F_d$ constant. Thus, knowing the cutoff $F_c$, the spectrum corner $F_d$ and hence flow rate can be evaluated.

The flow rate of either laminar flow or turbulent flow is equal to the average flow velocity multiplied by the flow area of the pipe. The output signal at conductor 62 can be passed through the voltmeter 64 which could be calibrated with an appropriate scale 65 to indicate the velocity and/or flow units of the slurry. The output signal $F_p$ from line 67 can also be passed through a frequency activated meter 69 to indicate as on scale 70 the repetition rate of the pulsed signal from the frequency convertor, and/or can be scaled to indicate the actual velocity or flow of the slurry. Further, an integrator (not shown) could be used in accumulating the successively obtained flow rates for determining the total slurry passed through the pipe over an extended period.

The fractional ratio constant Y can be most any value between approximately 0.2 and 0.99 (<1) for measuring laminar flow. This is possible because the constant power spectrum, as provided by a Fourier analysis, has a generally uniform amplitude throughout the bandwidth of different frequencies, and the area under the spectrum is proportional to the cutoff frequency or to the maximum frequency (see FIG. 3). However, the power spectrum provided by the Fourier analyzer for turbulent flow is nonuniform, but more generally assumes a narrow inverted and continuous distribution curve only approximately one-half octave wide across the half power amplitude, where the peak is shifted more toward the maximum frequency (see FIG. 6). The average velocity will occur at the frequency that splits the power spectrum in two by area. This will be approximately where Y is equal to 0.5. Thus, by selecting Y as always equal to 0.5, the flowmeter can be used for either laminar or turbulent flow conditions without any recalibration.

The disclosed Doppler flowmeter has all physical structure located outside of the pipe, and can be used on most any type of slurry. The slurry therefore need not be magnetic, transparent or nonviscous, parameters that have limited the success and accuracy of other externally located flowmeters. Moreover, the positioning of the transducers on adjacent sides of the pipes or on opposite sides of the pipe do not materially affect the accuracy of the flowmeter, so that the sender and receiver transducers can be angularly and/or axially varied somewhat relative to the pipe as determined for convenience.

The advantage that all of the flowmeter apparatus can be located outside of the pipe however need not require that the transducers in fact be located there, if such positioning is not required because of the conditions of the flow and/or material. In other words, the transducers can be located inside the pipe, if such were desired, such as in special annular chambers accessible through windows in the pipe walls, while the improved circuit could be used to analyze the signal. Also, while the disclosure shows the signal being impulsed against the direction of the flow, the signal can also be sent in the same direction as the flow stream. The resulting scattered frequency shift however will be to a lesser frequency than the input signal, but the disclosed concept will allow for the same analysis of the signal and the resultant determination of the velocity or flow rate of the slurry.

The disclosed flowmeter has been used successfully in a coal slurry plant where oil and 5-45% by weight solid particulates, 95% of which are sized through a 100 mesh screen, were flowing at 0.5 to 4.5 ft. per second at temperatures ranging between 175°-400° C. and at pressures of approximated 300 psi. The particular flowmeter as developed has been operated by the Argonne National Laboratory according to the following general catalog of components listed by part name and number, model number, and manufacturer.

| Part Name and Number | Model Number | Manufacturer |
| --- | --- | --- |
| Transducers 16, 18 | NDT type 0.5 MHz | Parametrics |
| | | KB - Aerotech |
| Mixer Component 30 | SRA 3 | Mini Circuits, Inc. |
| High Pass Filter 36 | R5611 | EG&G Reticon |
| Squaring Circuit | AD 534 | Analog Devices |
| Dividing Circuit 46 and Adder 54 | AD 535 | Analog Devices |
| Voltage to Frequency Convertor 66 | VFL 32 | Burr Brown |
| Frequency Controlled Low Pass Filter 48 | R5609 | EG&G Reticon |

The embodiments of the invention in which an exclusive property or privilege is claimed are defined as follows:

1. A method of determining the velocity of a slurry flowing in a pipe, comprising the steps of radiating a fixed-frequency ultrasonic signal obliquely into the pipe toward its center and receiving off the flowing slurry a scattered signal that is varied according to the slurry flow and combining the fixed-frequency and scattered signals to give a Doppler shift signal, filtering the Doppler shift signal off the high frequency end and comparing the filtered signal against the Doppler shift signal to obtain a fractional ratio signal, comparing the fractional ratio signal against a preset fractional ratio signal and minimizing the divergence of the fractional ratio signals in a feedback loop, and determining from the feedback loop and the present fraction ratio signal the bandwidth frequencies of the filtered and the Doppler shift signals, which bandwidth frequencies are proportional to and can be used to determine the velocity of the slurry flow.

2. A method of determining the velocity of slurry flow according to claim 1, further comprising the steps of rectifying the Doppler shift signal and the filtered signal before comparing them.

3. A method of determining the velocity of slurry flow according to claim 1, further comprising the steps of comparing the preset fractional ratio against the fractional ratio signal to obtain an error function and amplifying this error function by a large value significantly greater than 1, and inputting this amplified signal into a voltage-to-frequency convertor which thereby produces a pulsed signal at a variable but known repetition rate, inputting the pulsed signal into a low pass frequency-controlled filter which thereby variably filters out the upper bandwidth frequencies of the Doppler shift signal to provide a cutoff signal of determinable bandwidth, and whereby the minimized divergence as provided by the feedback loop provides determination of the Doppler shift signal.

4. A method of determining the velocity of slurry flow according to claim 1, further comprising the steps of admitting the feedback loop divergence signal to a precise voltage-to-frequency convertor to provide a pulsed signal at a variable but known repetition rate, and admitting this pulsed signal to a frequency-controlled low pass filter to filter the Doppler shift signal and obtain the filtered signal having a known upper cutoff frequency, and determining then from the upper cutoff frequency the bandwidth of the Doppler shift signal.

5. A method of determining the velocity of slurry flow according to claim 4, further comprising the steps of squaring and averaging the Doppler shift and filtered signals before comparing them, whereby the voltage squared signals provide when compared the fractional ratio of the power spectrums of the signals.

6. A method of determining the velocity of slurry flow according to claim 5, further comprising the step of using 0.5 as the preset fractional ratio, whereby either laminar or turbulent flows of slurry can be measured with the same calibration.

7. Apparatus for determining the flow of a slurry in a pipe, comprising the combination of first and second transducer means secured at spaced locations in sound transmitting and receiving relationship to the pipe, means for activating the first transducer for sending a fixed-frequency ultrasonic signal obliquely into the pipe toward its center and means including the second transducer for receiving off the flowing slurry a scattered signal that is varied according to the slurry flow, means for combining the signals from the first and second transducers to determine thereby a Doppler shift signal, means for filtering off an upper bandwidth part of the Doppler signal to obtain a filtered signal, means for comparing the filtered and Doppler signals and for obtaining an amplified error function signal representing the divergence from a preset fixed fractional ratio, voltage-to-frequency convertor means operable for producing a pulsed signal at an adjustable rate of repetition proportional to the error function signal, said filtering means being frequency-controlled and means for admitting said pulsed signal to the filtering means for effectively filtering the shift signal by said preset fractional ratio to obtain the filtered signal, whereby the bandwidths of the Doppler and filtered signals will be known and are proportional to and give the slurry flow.

8. A Doppler flowmeter for determining flow of slurry in a pipe, the combination of a transmitter to emit a fixed frequency ultrasonic signal into the slurry, a receiver to detect the signal as scattered off particles in the slurry, means to combine the fixed and scattered signals to isolate a Doppler shift signal that is in the form of a continuous broadband of different frequencies from near zero up to the maximum, frequency controlled means to obtain a cutoff signal variably less than the Doppler shift signal, divider means to compare the cutoff and Doppler shift signals and obtain a fractional ratio and to generate an error function signal that is proportional to the departure of this fractional ratio from a preset fraction ratio, precise voltage-to-frequency convertor means that produces a pulsed signal that has a rate of repetition directly proportional to the error function signal, and means in the form of a feedback loop for introducing the pulsed signal as a control input to the frequency controlled means operable to minimize the error function signal, whereby the bandwidth of the Doppler shift signal and the cutoff ratio correlate to and provide the slurry flow.

* * * * *